June 3, 1924.
G. R. RICH
LAWN MOWER
Filed Feb. 15, 1922
1,496,129
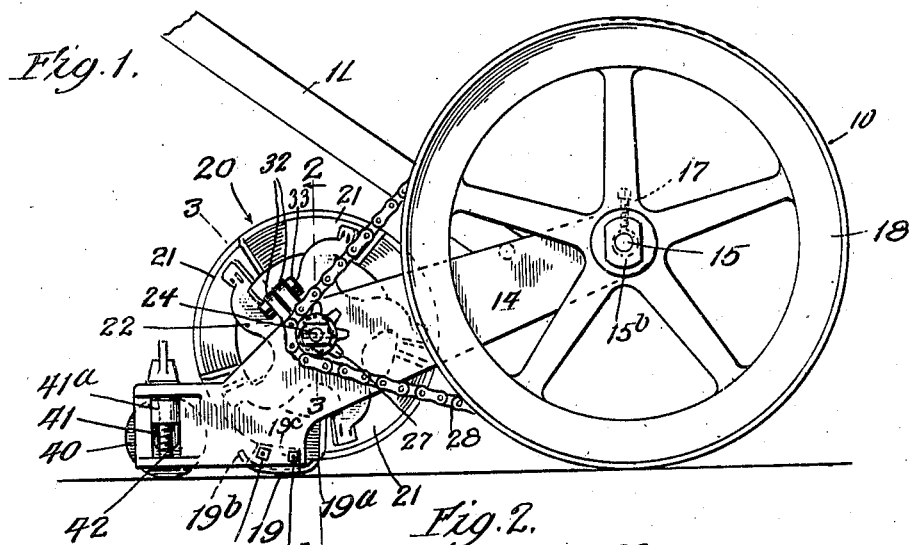
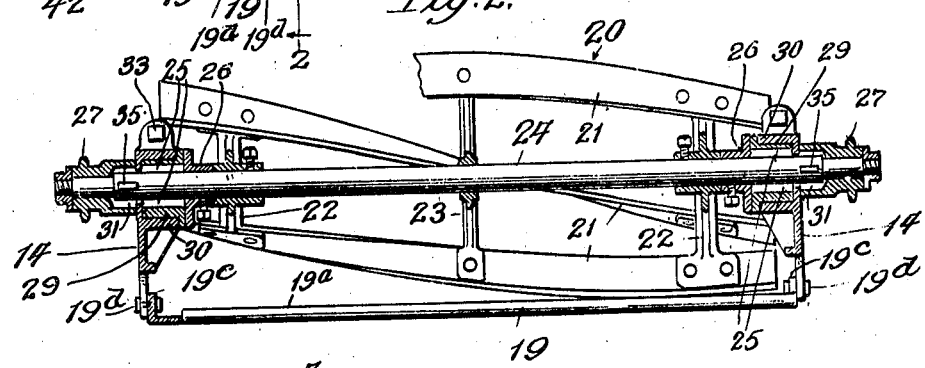
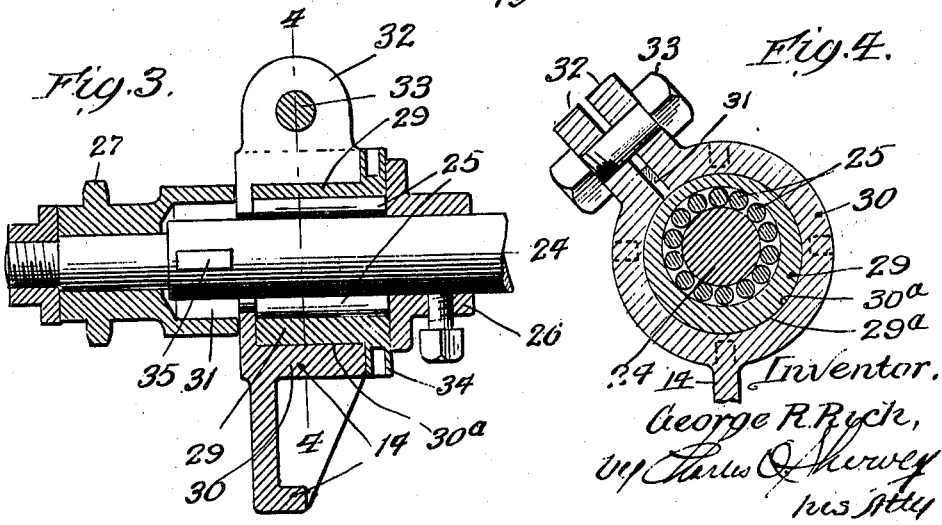
Inventor.
George R. Rich,
by Charles O. Hervey
his Atty Patented June 3, 1924.

1,496,129

UNITED STATES PATENT OFFICE.

GEORGE R. RICH, OF LOS ANGELES, CALIFORNIA, ASSIGNOR TO RICH STEEL PRODUCTS COMPANY, OF VERNON, CALIFORNIA, A CORPORATION OF CALIFORNIA.

LAWN MOWER.

Application filed February 15, 1922. Serial No. 536,694.

*To all whom it may concern:*

Be it known that I, GEORGE R. RICH, a citizen of the United States, and a resident of Los Angeles, Los Angeles County, California, have invented certain new and useful Improvements in Lawn Mowers, of which the following is declared to be a full, clear, and exact description.

This invention relates to lawn mowers, and more particularly to the cutting mechanism thereof. The principal object of this invention is to provide simple, novel and efficient means for adjusting the cutter head of the mower toward the stationary knife, when setting up the cutter head. Another object is to provide a stationary knife of novel construction, which shall also serve as a cross-connection between the side frame members of the mower. Another object is to increase the efficiency of lawn mowers, and to provide a practical, substantial machine, which is not likely to become worn out from ordinary usage.

The invention consists in the several novel features hereinafter fully described and claimed.

The invention is clearly illustrated in the accompanying drawing, in which:

Fig. 1 is a side elevation of a lawn mower embodying a simple form of the present invention, with the handle partly broken away; Fig. 2 is a vertical cross-section taken on line 2—2 of Fig. 1; Fig. 3 is a detail section taken on line 3—3 of Fig. 1 and Fig. 4 is a detail section taken on line 4—4 of Fig. 3.

Referring to said drawings, which illustrate one embodiment of the present invention, the reference character 10 designates the head and 11 the handle of a lawn mower. The frame of the head comprises two side frame members 14, suitably spaced apart to receive the cutter head 20 therebetween. The forward ends of the side frame members are rigidly connected by a rod 15, which extends through holes in the forward ends of said frame members and is bolted thereto by bolts 17. Traction wheels 18 are rotatively mounted upon the end portions of said rod 15 and are held thereon by nuts 15$^b$ which are threaded upon the ends of said rod 15. The rear ends of said side frame members are rigidly connected together by a knife bar 19, which is preferably constructed of a steel plate curved upwardly along both edges, as at 19$^a$, 19$^b$, to stiffen the same and to provide the cutting edge 19$^a$, and having its end portions bent up to form flanges or lugs 19$^c$, that engage the inner or opposing sides of the side frame members and are secured thereto by bolts and nuts 19$^d$. Adjustably mounted on the rear ends of the side frame members 14, is a roller 40, which supports the rear end of the machine. Said roller is rotatively mounted on brackets 41, which have internally threaded lugs 41$^a$, that are mounted upon adjusting screws 42. The latter are rotatively mounted in the side frame members and have winged heads on their upper ends by which they may be readily turned to raise and lower the roller 40. The lug 41$^a$ of each bracket 41 extends through a vertical slot in the side frame member and is guided therein. The roller may be adjusted vertically to raise or lower the frame, and cutting mechanism carried thereby, to cut close to the ground, or farther away therefrom, as is well understood.

Between the traction wheels 18 and roller 40 is the cutter head 20, which is mounted on a shaft 24 that has a pair of sprocket wheels 27 connected to it by pawl and ratchet mechanism 31, 35, and said sprocket wheels are connected to and driven from the traction wheels by drive chains 28, which are trained over said sprocket and traction wheels.

The cutter head 20 comprises, in general, a plurality of spirally formed knife blades 21 arranged circumferentially around a shaft 24, and connected thereto by blade carrying spiders 23, 22, the latter being fixedly secured to the shaft by set screws. The cutter head is located above the knife 19 at a position where the cutting edges of the blades 21 will effect a cutting action, while passing the cutting edge of the stationary knife 19.

For the purpose of adjusting the cutter head to function properly, the shaft 24 is journalled in a pair of bearing blocks or bushings, 29, whose outer faces 29$^a$ are eccentrically disposed with respect to the shaft 24 and are mounted in apertures 30$^a$ in bosses 30 formed on the side frame members 14. Each boss 30 is split, as at 31, (see Fig. 4) and is formed with ears 32, through which extends a clamping screw or bolt 33, which is tightened up to clamp the bearing bushing 29 tightly in the boss at any position of adjustment. Preferably, a flange 34 is formed on the outer end of each bushing 29 and radial sockets are formed in the peripheral face of the flange into which may be placed a pin or other implement to act as a lever for turning the bushing in changing the position of the shaft 24. Collars 26 are secured on the shaft 24 adjacent the bushings and take up any end thrust of the shaft. Anti-friction rollers 25 may be interposed between the shaft 24 and bushings 29, to reduce friction therebetween.

When it is desired to adjust the cutter head toward the stationary knife 19, the screws or bolts 33 are loosened, and the bushings 29 are turned in the bosses 30 until the cutting edges of the blades 21 practically contact with the cutting edge of the stationary knife 19 along their entire length, after which the screws 33 are tightened up to clamp the bushings in place in the bosses. It is obvious that the eccentric connection between the shafts 24 and bosses 30 provides an extremely delicate adjustment means for said cutter head, whereby the cutting edges of the co-acting blades may be brought into neat cutting relation.

The driving mechanism for the cutter head is more fully set forth in a co-pending application filed by me on even date herewith, and designated by the Serial No. 536,693.

More or less variation of the exact details of construction is possible, without departing from the spirit of this invention; I desire, therefore, not to limit myself to the exact form of the construction shown and described, but intend in the following claims to point out all of the invention disclosed herein.

I claim as new and desire to secure by Letters Patent:

1. In a lawn mower, the combination of side frame members, a stationary knife secured thereto, a rotary cutter head containing circumferentially arranged knife blades co-acting with said stationary knife, a driven shaft upon which said cutter head is mounted, bearing bushings in which said shaft is journalled, supported by said side frame members and having an eccentric connection therewith, whereby said cutter head may be adjusted relative to the stationary knife, and clamping means for holding said bushings in any position of adjustment.

2. In a lawn mower, the combination of side frame members, a stationary knife secured thereto, a rotatory cutter head containing circumferentially arranged knife blades co-acting with said stationary knife, a driven shaft upon which said cutter head is mounted, bearing bushings, in which said shaft is journalled, the outer faces of which bushings are eccentrically disposed with respect to the axis of the shaft, said side frame members having apertures for the reception of said bushings, and clamping means for clamping said bearing bushings in said apertures.

3. In a lawn mower, the combination of side frame members, a stationary knife secured thereto, a rotatory cutter head containing circumferentially arranged knife blades co-acting with said stationary knife, a driven shaft upon which said cutter head is mounted, bearing bushings, formed with eccentrically disposed internal and external surfaces, said shaft being journalled in said bushings and said bushings being rotatively mounted in apertures in said side frame members, and clamping means for securing said bushings in various positions of adjustment.

4. In a lawn mower, the combination of side frame members, formed with apertured split bosses and ears projecting from the split portions of the bosses, clamping screws extending through said ears, bearing bushings formed with eccentrically disposed internal and external surfaces and rotatively secured in said bosses, a stationary knife secured to said side frame members, a rotatory cutter head containing circumferentially arranged knife blades co-acting with said stationary knife, and a driven shaft upon which said cutter head is mounted, journalled in said bushings.

5. In a lawn mower, the combination of side frame members formed with apertured bosses, flanged bearing bushings formed with eccentrically disposed internal and external surfaces and rotatively secured in said bosses, means on said bosses for securing said bearing bushings against rotation in said bosses, a stationary knife secured to said side frame members, a rotary cutter head containing circumferentially arranged knife knife blades co-operating with said stationary knife and a driven shaft upon which said cutter head is mounted, journalled in said bushings.

6. In a lawn mower, the combination of side frame members formed with apertured bosses, flanged bearing bushings formed with eccentrically disposed internal and external surfaces, and rotatively secured in said bosses, means for securing said bearing bushings against rotation in said bosses, a stationary knife secured to said side frame members, a rotary cutter head containing circumferentially arranged knife blades co-operating with said stationary knife, and a driven shaft upon which said cutter head is mounted, journalled in said bushings, the flanges of said bushings being formed for engagement with a tool, whereby said bushings may be turned to adjust the cutter head with respect to the stationary knife.

GEORGE R. RICH.